US008070163B2

(12) United States Patent
Ogilvie

(10) Patent No.: US 8,070,163 B2
(45) Date of Patent: Dec. 6, 2011

(54) MULTILINGUAL-TILE WORD GAMES

(76) Inventor: John Ogilvie, Salt Lake City, UT (US)

( * ) Notice: Subject to any disclaimer, the term of this patent is extended or adjusted under 35 U.S.C. 154(b) by 0 days.

(21) Appl. No.: 12/946,177

(22) Filed: Nov. 15, 2010

(65) Prior Publication Data

US 2011/0133405 A1   Jun. 9, 2011

Related U.S. Application Data

(60) Provisional application No. 61/266,212, filed on Dec. 3, 2009, provisional application No. 61/329,032, filed on Apr. 28, 2010.

(51) Int. Cl.
A63F 3/00 (2006.01)
(52) U.S. Cl. ......................................................... 273/272
(58) Field of Classification Search .................... 273/272
See application file for complete search history.

(56) References Cited

U.S. PATENT DOCUMENTS

| 4,014,548 | A | * | 3/1977 | Trilling | 273/272 |
|---|---|---|---|---|---|
| 4,043,560 | A | * | 8/1977 | Blackman | 273/236 |
| 4,115,932 | A | * | 9/1978 | Charlesworth | 434/167 |
| 4,341,387 | A | * | 7/1982 | Freyman | 273/240 |
| 4,550,915 | A | * | 11/1985 | Meyer | 273/272 |
| 4,611,995 | A | | 9/1986 | Sado | |
| 4,682,777 | A | * | 7/1987 | Wood | 273/243 |
| 4,715,608 | A | * | 12/1987 | Burt | 273/248 |
| 4,884,972 | A | * | 12/1989 | Gasper | 434/185 |
| 5,435,564 | A | * | 7/1995 | Kennedy et al. | 273/237 |
| 5,520,394 | A | * | 5/1996 | Brueckner | 273/272 |
| 5,702,105 | A | * | 12/1997 | Glikmann | 273/272 |
| 5,996,999 | A | * | 12/1999 | Casely | 273/148 R |
| 6,283,476 | B1 | * | 9/2001 | Henry et al. | 273/459 |
| 6,305,688 | B1 | * | 10/2001 | Waroway | 273/292 |
| 6,412,781 | B1 | * | 7/2002 | Lund | 273/299 |
| 6,446,967 | B1 | * | 9/2002 | Jamali | 273/236 |
| 6,508,468 | B1 | * | 1/2003 | Challice | 273/272 |
| 6,537,128 | B1 | | 3/2003 | Hampton et al. | |
| 6,544,098 | B1 | | 4/2003 | Hampton et al. | |
| 6,921,074 | B2 | * | 7/2005 | Cavallo | 273/272 |
| 7,044,467 | B1 | * | 5/2006 | Dimmig | 273/272 |
| 7,216,868 | B2 | * | 5/2007 | Groz et al. | 273/272 |
| 7,334,793 | B2 | * | 2/2008 | Hurwitz | 273/273 |
| 2003/0057649 | A1 | * | 3/2003 | Herman et al. | 273/299 |

(Continued)

OTHER PUBLICATIONS

"Amazon.com . . . Toys & Games", Retrieved from <<http://www.amazon.com....>>, retrieved Dec. 4, 2009, 77 Pages.

(Continued)

Primary Examiner — Alvin Hunter
Assistant Examiner — Dolores Collins
(74) Attorney, Agent, or Firm — Ogilvie Law Firm

(57) ABSTRACT

In a set of multilingual tiles, each tile bears a first character of a first language and also bears a second character of a second language. Tiles are positioned by players of a game, to form words in an inherently multilingual educational and entertainment experience. Tile characters are not mere transliterations of one another. The characters on a given tile may have different spatial orientations. Sometimes each player can make words only in one language, and different players try to make words in different languages. Sometimes a player gains points for words made in a language that is not the player's native language, and loses points for words made in a language that is the player's native language. Extra points may be awarded if tiles form multiple words in multiple languages, or if tiles form related words, namely, synonyms and/or antonyms.

5 Claims, 3 Drawing Sheets

U.S. PATENT DOCUMENTS

2003/0111792 A1* 6/2003 Yu et al. .................. 273/273
2007/0298387 A1 12/2007 McIlvain et al.

OTHER PUBLICATIONS

"Amazon,com . . . Word . . . Toys & Games", Retrieved from <<http://www.amazon.com . . . >>, retrieved Dec. 4, 2009, 37 Pages.

"Scrabble Board Games", Retrieved from <<http://www.boardgamecentral.com/games/scrabble.html>>, retrieved Dec. 3, 2009, 3 Pages.

"Scrabble Tiles", Retrieved from <<http://files.boardgamegeek.com/file/download/45o0f4epqu/Scrabble_tiles.pdf>>, retrieved Dec. 3, 2009, 31 Pages.

"Boggle", Retrieved from <<http://en.wikipedia org/wiki/Boggle>>, Nov. 22, 2009, 4 Pages.

"Consonant Pain—No Pain No Game", Retrieved from <<http://www.consonantpain.com/>>, copyright 2005, 3 Pages.

"Learn Kenji with Twitter!". Retrieved from <<http://blogs.japanesepod101.com/blog/2009/04/22/learn-kanji-with-twitter-have-fun-learni...>>, Apr. 22, 2009, 7 Pages.

"Has anyone found a Japanese version of Scrabble?", Retrieved from <<http://forum.koohii.com/viewtopic.php?id=2442>>, Dec. 27, 2008, 3 Pages.

"Re: Query about non English boardgames", Retrieved from <<http://osidr.com/ml/games.board-game-design/2005/msg00037.html>>, Apr. 18, 2005, 3 Pages.

"Crosswords Home on Sourceforge", Retrieved from <<http://xwords.sourceforge.net/...>>, retrieved Dec. 3, 2009, 2 Pages.

"Joined at the Stitch—Japanese scrabble", Retrieved from <<http://joinedatthestitch.com/blog/?p=347>>, May 16, 2009, 2 Pages.

"Tack Tiles (R)", Retrieved from <<http://tack-tiles.com>>, copyright 2002, 24 Pages.

"Yamazaki's Japanese Scrabble Page", Retrieved from <<http://www.toride.com/~yamazaki/scrabble/>>, Apr. 2, 2003, 3 Pages.

"Hiragana Frequency Table", Retrieved from <<http://www-rohan.sdsu.edu/~gawron/crypto/japanese_models/hir_freq.html>>, no later than Dec. 2, 2009, 7 Pages.

* cited by examiner

|   |   |   |
|---|---|---|
| きょ | しょ |   |
|   | C | 3 |
| よ | 三 | の |

| く |   | ぐ | る |   | ぶ | は |   | ま |
|---|---|---|---|---|---|---|---|---|
|   | G | 3 |   | R | 4 |   | A | 1 |
| つ | 五 | ぬ | fu | 五 | む | な | 四 | ば |

|   |   |   |
|---|---|---|
| ます | して |   |
|   | T | 2 |
| 方 | 七 | ぞ |

MULTILINGUAL-TILE WORD GAMES

RELATED APPLICATIONS

The present application claims priority to, and incorporates by reference, U.S. provisional application No. 61/266,212 filed Dec. 3, 2009 and U.S. provisional application No. 61/329,032 filed Apr. 28, 2010.

BACKGROUND

Word games such as the SCRABBLE®, UPWORDS®, and BOGGLE® word games are well known. (SCRABBLE®, UPWORDS®, and BOGGLE® are marks of Hasbro, Inc.) However, multilingual games of any kind are rare. Some versions of the SCRABBLE® game are played in multiple languages, but only one language at a time is used, with all players making words in the same language. A different tile set may be used for each language, e.g., one set of tiles for play in English, another set of tiles for play in French, another set for Arabic play, and so on. Some versions of the SCRABBLE® game are played in multiple languages at one time, e.g., with one player making words in English and an opposing player making words in Hungarian; the players may use an English tile set mixed with a Hungarian tile set in this case. However, the SCRABBLE® tiles (and UPWORDS® tiles) themselves are monolingual tiles, because they have only one character per tile. A word game using several characters on each tile has been proposed, but the tiles are again monolingual because all characters on a given tile (and apparently all characters in the tile set) belong to a single language.

SUMMARY

Some embodiments include a board and a set of multilingual tiles, with each tile bearing a first character of a first language and also bearing a second character of a second language, in which the second character is not a transliteration of the first character. The multilingual tiles and the board are compatible in that they permit positioning of selected tiles to form words. For example, the languages can be Japanese and English, English and Chinese, or another pair (or more) of naturally occurring languages. In some embodiments, Japanese personal names are allowed as accepted words, that is, as a legal move during game play.

In some embodiments, at least some of the multilingual tiles include multiple spaced-apart characters per language for at least one of the languages. In some, the characters are not mere transliterations or near-transliterations of one another. In some, the characters share a phonetic characteristic. In some, the multilingual tiles evidence a cross-language correspondence based on character frequency.

In some embodiments, the words interlock and every sequence of adjacent tiles in the positioned tile forms a word in at least one of the languages. In some, the words are located in a grid of adjacent positioned tiles which also includes character sequences that are not accepted (e.g., not in the chosen dictionary or approved by the opposing player) as a word in at least one of the languages. In some, the characters on a given tile have different spatial orientations from one another.

In some embodiments, the multilingual tiles and the game board are non-digital, while in other embodiments some or all game components are digital. For example, some embodiments include a logical processor, a memory in operable communication with the logical processor, and game code residing in the memory and having data and instructions configured to cause processor(s) to move the digital multilingual tiles into arrangements on the digital board.

Some embodiments include obtaining a set of multilingual tiles, with each tile bearing a first character of a first language and also bearing a second character of a second language, in which the second character is not a transliteration of the first character, and positioning selected tiles to form words. One may assign point values to words formed by positioned tiles, and may position tiles in interlocking words such that every positioned tile is part of every word in every direction it touches. Sometimes each player can make words only in one language, and different players try to make words in different languages. Sometimes a player gains points for words made in a language that is not the player's native language, and loses points for words made in a language that is the player's native language. Extra points may be awarded if tiles form multiple words in multiple languages, or if tiles form related words, namely, synonyms and/or antonyms.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 5 is a diagram illustrating an arrangement of multilingual-tiles of a game.

DETAILED DESCRIPTION

Overview

Figure 1:
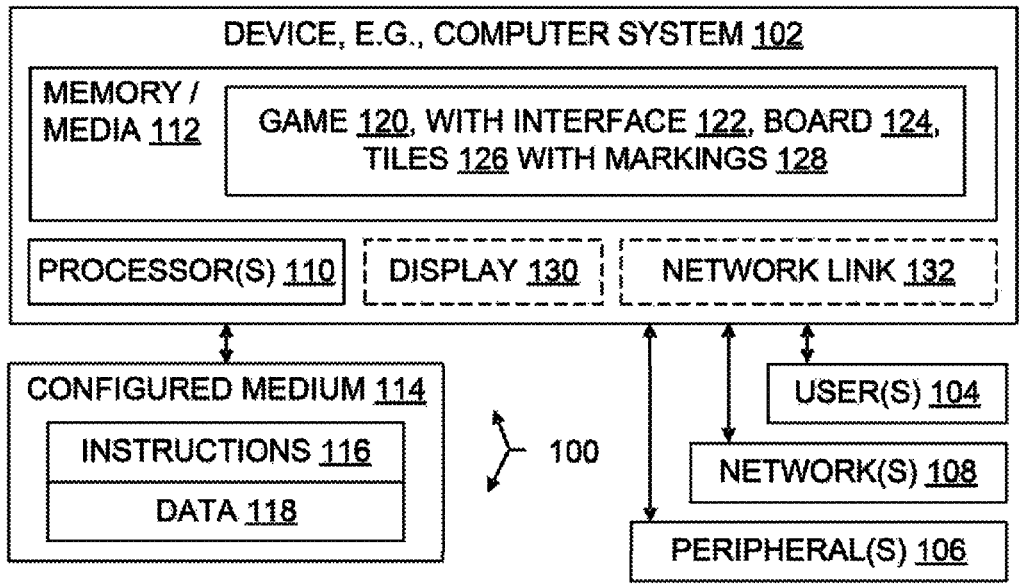
FIG. 1 is a block diagram illustrating a computer system having at least one processor, at least one memory, at least one multilingual-tile game, and other items in an operating environment which may be present on multiple network nodes, and also illustrating configured storage medium embodiments.

Although word games using "tiles" (individual pieces with markings thereon) have been known for decades, certain fun and educational word games for multilingual players are lacking. Some games are available in multiple languages, but only one language at a time is used, with all players making words in the same language. Some games are played in multiple languages at one time, e.g., with one player making words in English and an opposing player making words in Hungarian; the players may use an English tile set mixed with a Hungarian tile set in this case. However, the game pieces themselves are monolingual tiles, because they have only one character per tile. Even if a word game uses several characters on each tile, the tiles may be monolingual in that all characters on a given tile (and all characters in the tile set) belong to a single language.

By contrast with approaches limited to monolingual tiles, embodiments described herein provide multilingual tiles as an integral part of the game. Multilingual play is facilitated, as opposed, for example, to merely providing versions of a game in multiple languages which are nonetheless meant to be used in monolingual play experiences.

Some embodiments described herein may be viewed in a broader context. For instance, concepts such as character arrangement, character frequency, phonetics, scoring points in a game, and facility with languages may be relevant to a particular embodiment. However, it does not follow from the availability of a broad context that exclusive rights are being sought herein for abstract ideas; they are not. Rather, the present disclosure is focused on providing appropriately specific embodiments. Other media, systems, articles, and processes involving character arrangement, character frequency, phonetics, scoring points in a game, and facility with languages, for example, are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/or elsewhere in the application file.

As used herein, a "game" is a set of tiles and a set of rules for arranging the tiles in a competition (solitary or for at least two players). A game may include a board for receiving tile arrangements, or may presume that the board will be supplied by the player(s). A game may include digital components, non-digital components, or both. Digital components are implemented in software and/or computer system hardware, whereas non-digital components are not.

A "board" may be a digital computer system screen (and corresponding memory), for example, and/or a cardboard, wooden, plastic, or other non-digital sheet, grid, base, set of recesses, or other tile-bearing item. Multiple physically separate pieces designed to be used together may for a board. A board includes a screen, surface, base or other mechanism for positioning selected tiles to form words (dictionary words, equations, etc.) during game play.

A "title" may be a digital item, such as a visual representation on a digital computer system screen (and corresponding data structure configuring digital memory), for example, and/or a cardboard, wooden, plastic, or other non-digital character-bearing item which bears characters in multiple languages for multilingual game play.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind;

they are performed with a machine. However, "automatically" does not necessarily mean "immediately".

Throughout this document, use of the optional plural "(s)" means that one or more of the indicated feature is present. For example, "tile(s)" means "one or more tiles" or equivalently "at least one tile".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "placing", "sending", "displaying", or "viewing" and a destination may involve intervening action such as moving, forwarding, instructing, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments and Digital Systems

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. Developers, teachers, students, engineers, and end-users are examples of users 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable non-transitory storage media 112. Media 112 may be of different physical types. The media 112 may be volatile memory, non-volatile memory, fixed in place media, removable media, magnetic media, optical media, and/or of other types of non-transitory media (as opposed to transitory media such as a wire that merely propagates a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example.

The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as non-digital tiles, non-digital boards, character images, character arrangements, character and character arrangement readings, and so forth. Such data is also transformed by multilingual tile game play as discussed herein, e.g., by constraining, highlighting, hiding, arranging, deployment, execution, modification, display, creation, loading, and/or other operations.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface link(s) 132 which can provide access to networks 108, using components such as a packet-switched network interface card, a wireless transceiver, or a telephone network interface, for example, will be present in such a computer system. However, an embodiment may also communicate through direct memory access, removable nonvolatile media, or other information storage-retrieval and/or transmission approaches, or an embodiment in a computer system may operate without communicating with other computer systems.

A digital implementation of a game 120 resides in the system 102. The digital game 120 (also referred to herein as game code) includes a user interface 122, a digital board 124, and digital multilingual tiles 126 which bear markings 128. Familiar software and hardware gaming, user interface, processing, and other tools and techniques may be used in the digital implementation of game 120, adapted to provide play experience according to rules described herein, with multilingual tiles as discussed herein. The board and tiles may be displayed on a CRT, LED, LCD, plasma, touch screen, and/or other display 130.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems Generally and Articles

Figure 2:
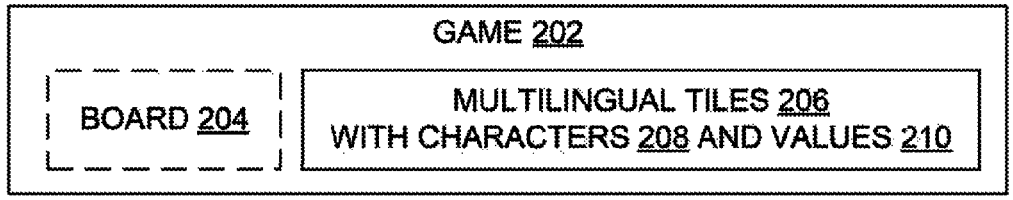
FIG. 2 is a block diagram illustrating some multilingual-tile games.

FIG. 2 illustrates systems generally, which have digital and/or non-digital components, as well as articles of manufacture. A distinction between systems and articles may be convenient, e.g., when viewing an individual tile as part of a systems that includes multiple tiles. However, unless clearly indicated otherwise, all statements herein regarding systems apply equally to articles and vice versa. Also, "device" is used interchangeably with "system" herein unless clearly indicated otherwise. Many, but not all, systems (devices) described herein are digital systems, e.g., computer systems 102.

Figure 3:
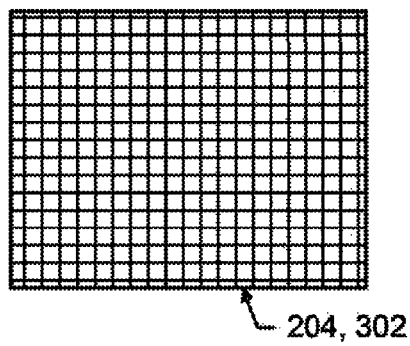
FIG. 3 is a diagram illustrating a board for a multilingual-tile game.
Figure 4:
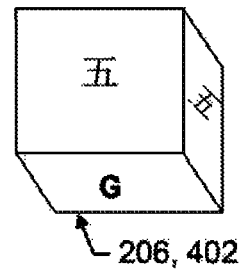
FIG. 4 is a diagram illustrating a multilingual-tile of a game.

A game 202 may include a board 204, or may not. A game 202 does include multiple multilingual tiles 206. A game 202 may be a fully digital game 120, or the game 202 may have non-digital components, e.g., a non-digital board and/or non-digital tiles. FIG. 3 illustrates a non-digital board 302, which is an example of boards 204 generally, in the form of a sheet having a grid to facilitate tile positioning. FIG. 4 illustrates a non-digital tile 402, which is an example of tiles 206 generally. Tiles 206 bear markings, which do include characters 208 and which may include point values 210. FIG. 5 further illustrates markings on some example tiles 206; tiles are configured during game 202 play in arrangements such as an arrangement 502 shown in FIG. 5.

Some embodiments include a device (system) including a set of multilingual tiles 206, each tile bearing a first character 208 of a first language and also bearing a second character 208 of a second language, in which the second character is not a transliteration of the first character. Some also include a board 204. The multilingual tiles 206 and the board 204 are compatible in that they permit positioning of selected tiles to form words.

In some embodiments, the languages are Japanese and English.

In some embodiments, the words interlock, e.g., in crossword puzzle manner as shown in FIG. 5, and every sequence of adjacent tiles 206 in the positioned tiles forms a word in at least one of the languages.

In some embodiments, the words are located in a grid of adjacent positioned tiles 206 which also includes character sequences that are not accepted (e.g., not in the chosen dictionary and/or not approved by the opposing player) as a word in at least one of the languages.

In some embodiments, the multilingual tiles 206 and the board 204 are non-digital.

In some embodiments, at least some of the multilingual tiles 206 include multiple spaced-apart characters 208 per language for at least one of the languages.

In some embodiments, at least some of the multilingual tiles 206 include multiple spaced-apart characters that are not mere transliterations or near-transliterations of one another.

In some embodiments, at least some of the multilingual tiles 206 include multiple spaced-apart characters that share a phonetic characteristic.

In some embodiments, at least some of the multilingual tiles 206 evidence a cross-language correspondence based on character frequency.

In some embodiments, at least some of the multilingual tiles 206 evidence characters 208 which have different orientations (spatially) from one another.

Some embodiments are in the form of a computer system 102, wherein the multilingual tiles 206 include digital multilingual tiles 126, the board 204 includes a digital board 124, and the device further includes a logical processor 110, a memory 112 in operable communication with the logical processor, and game code 120 residing in the memory. The game code has data 118 and instructions 116 configured to cause processor(s) 110 to move the digital multilingual tiles 126 into arrangements on the digital board 124, in response to commands from a user 104.

Processes

Figure 6:
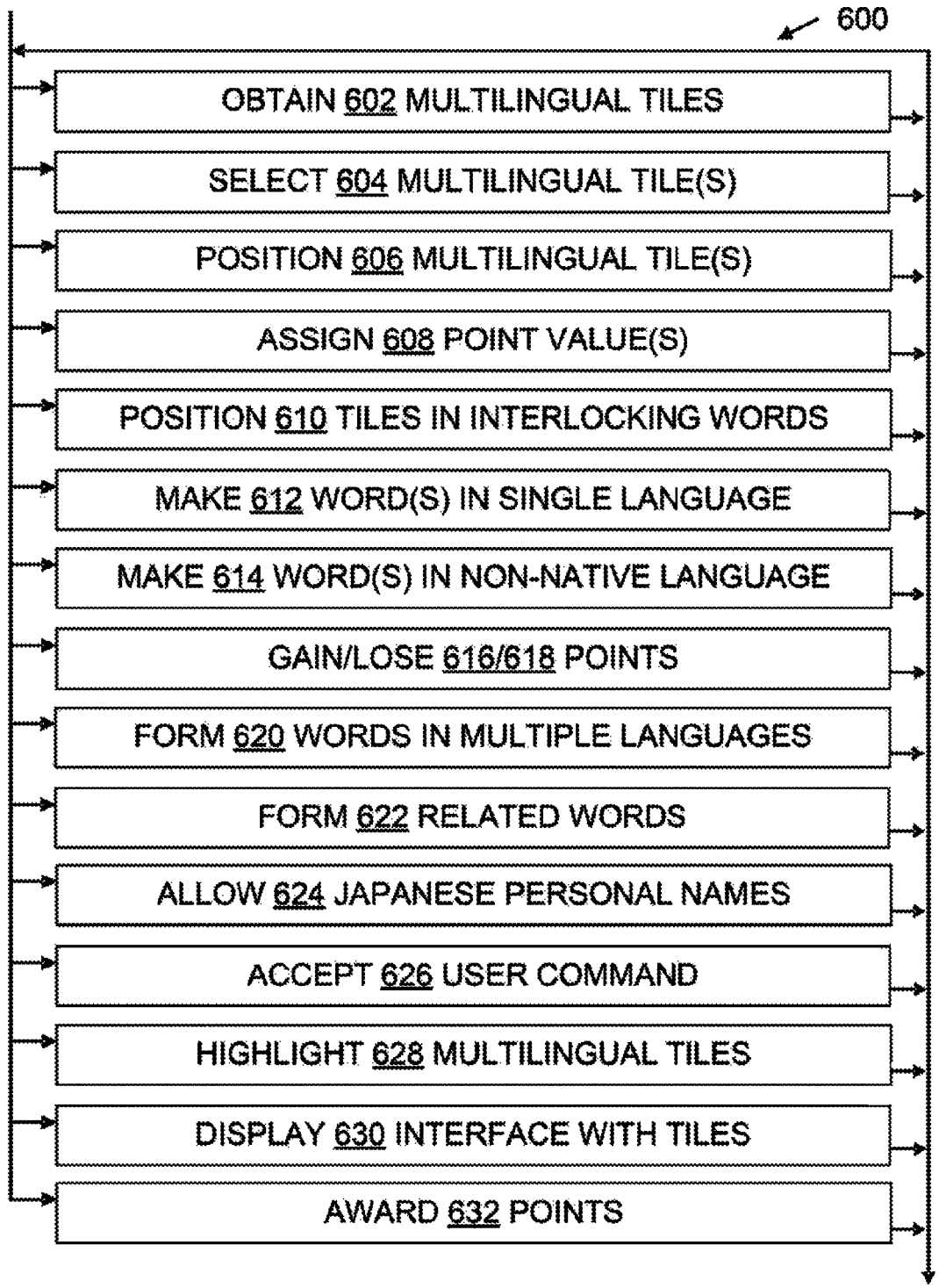
FIG. 6 is a flow chart illustrating steps of some process and configured storage medium embodiments.

FIG. 6 illustrates some process embodiments in a flowchart 600. Processes shown in the Figures may be performed in some embodiments in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 6. Steps may be performed serially, in a partially overlapping manner, or fully in parallel. The order in which flowchart 600 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During an obtaining step 602, a player (or a game 120 operating on behalf of a player) obtains multilingual tiles 206, e.g., by gaining physical possession of non-digital tiles 402 (cubical or in other shape(s)), or by running or commanding a digital game 120 which displays digital tiles 126.

During a selecting step 604, a player (or a game 120 operating on behalf of a player) selects a multilingual tile 206, e.g., by picking up a non-digital tile or by using a cursor placement or other user interface mechanism to select a digital tile.

During a positioning step 606, a player (or a game 120 operating on behalf of a player) positions a multilingual tile 206, e.g., by laying a non-digital tile on the board or by moving a digital tile on a display 130.

During a point assigning step 608, a player (or a game 120 operating on behalf of a player) assigns a point value to the step 606 move, e.g., based on values 210 of tiles which form a word as a result of the move.

During an interlocked positioning step 610, a player (or a game 120 operating on behalf of a player) positions a multilingual tile 206 in an arrangement of interlocked words.

During a single language word making step 612, a player (or a game 120 operating on behalf of a player) makes a word in a single language as required by the rules of play for the game in question. For example, for the duration of a game a native English speaker may make 612 words in only some other (non-English) language in some embodiments. Different embodiments may have different rules of play.

During a non-native language word making step 614, a player (or a game 120 operating on behalf of a player) makes a word in a non-native language as required by the rules of play for the game in question. For example, during a move a native English speaker may make 614 a word in some other (non-English) language in some embodiments.

During a point gaining step 616, a player gains point(s) as a result of positioning 606 tile(s) 206. During a point losing step 618, a player loses point(s) as a result of positioning 606 tile(s) 206. Score changes may be calculated automatically by game code or manually by players.

During a multiple language words making step 620, a player (or a game 120 operating on behalf of a player) makes multiple words in multiple languages as a result of a single turn taken positioning 606 tile(s) 206.

During a related words making step 622, a player (or a game 120 operating on behalf of a player) makes related words as a result of a single turn taken positioning 606 tile(s) 206.

During a Japanese names allowing step 624, a player (or a game 120 operating on behalf of a player) allows word(s) which are Japanese personal names (as opposed to nouns denoting non-human things) as a result of a single turn taken positioning 606 tile(s) 206.

During a user command accepting step 626, game code 120 accepts a user 104 command through an interface 122, e.g., a command to position 606 tile(s), to start a new game, to end the current game, to check the acceptability of a proposed word, to show a history of scores, to contact another potential player over a network link 132, and/or other commands.

During a tile highlighting step 628, game code 120 highlights one or more of the tile(s) on the display 130.

During a displaying step 630, game code 120 displays tile(s) 206 on the display 130.

During a point awarding step 632, points are gained 616 by a player based on assigned 608 points and tile positioning 606.

The foregoing steps and their interrelationships are discussed further below, in connection with various embodiments.

Some embodiments provide a process for integrally multilingual tile game play, which obtaining 602 a set of multilingual tiles 206, each tile bearing a first character 208 of a first language and also bearing a second character 208 of a second language, in which the second character is not a transliteration of the first character; and positioning 606 selected tiles to form words.

Some embodiments include assigning 608 point values to words formed by positioned tiles. Some include positioning 606, 610 tiles in interlocking words such that every positioned tile is part of every word in every direction it touches.

In some embodiments, each player can make 612 words only in one language, and different players make their words in respective different languages. In some, a player gains 616 points for words made 614 in a language that is not the player's native language. In some, a player loses 618 points for words made in a language that is the player's native language.

In some embodiments, extra points are awarded 632 if tiles form 620 multiple words in multiple languages. In some, extra points are awarded 632 if tiles form 622 related words, namely, synonyms and/or antonyms.

In some embodiments, Japanese personal names (first names and/or family names) are allowed 624 as accepted words.

Configured Media

Some embodiments include a configured computer-readable storage medium 112. Medium 112 may include disks (magnetic, optical, or otherwise), RAM, EEPROMS or other ROMs, and/or other configurable memory, including in particular non-transitory computer-readable media (as opposed to wires and other propagated signal media). The storage medium which is configured may be in particular a removable storage medium 114 such as a CD, DVD, or flash memory. A general-purpose memory, which may be removable or not, and may be volatile or not, can be configured into an embodiment using items such as digital tiles 126 and instructions for game play provided in an interface 122, in the form of data 118 and instructions 116, read from a removable medium 114 and/or another source such as a network connection, to form a configured medium. The configured medium 112 is capable of causing a computer system to perform process steps for transforming layout data as disclosed herein. FIGS. 1 through 6 thus help illustrate configured storage media embodiments and process embodiments, as well as system and process embodiments. In particular, any of the process steps illustrated in FIG. 6, or otherwise taught herein, may be used to help configure a storage medium to form a configured medium embodiment.

Additional Examples

Some embodiments include a set of multilingual tiles 206 having at least two written languages per tile. A particular embodiment includes at least one Japanese hiragana character 208 and at least one English alphabet character 208 per tile. In a variation, one or more tiles is a blank free tile, with the blankness indicating the free tile can be used for any character in either language; a language-specific blank (or "*" or "free" or "nani" etc. instead of blank) free tile is also available in some embodiments. Some variations include kanji and hiragana (and English), some include hiragana and katakana (and English), some include kanji, hiragana, and katakana (and English) in the set of multilingual tiles. Some include three or more languages on each tile 206, or on at least some of the tiles 206.

Japanese and English are merely examples; other pairs (triplets, etc.) of languages may also be used on each tile 206 (or on a proper subset of the tiles 206) in a given embodiment. Any natural language or other nomenclature may be used, e.g., Indo-European languages, Asian languages, mathematical notation, chemical notation, and so on.

One benefit of mixing Japanese and English in games 202 requiring the positioning 610 of tiles 206 interlocking words and disallowing nonwords (as in SCRABBLE® and UPWORDS® style games) is that the presence of English words tends to help make possible the placement of additional words, in both languages. Even familiar English words tend to be significantly longer than three characters, whereas many familiar Japanese words are shorter, with many words having only three or four characters. Playing with a monolingual Japanese tile set would not provide this benefit. Longer words create more word placement possibilities.

Romaji is used in examples herein, but a given embodiment utilizing Japanese as one of the tile languages may include romaji (a, ka, sa, ta, na, etc.), hiragana (あ、か、さ、た、な、...), katakana (ア、カ、サ、タ、ナ), and/or kanji (亜、貨、悪、田、名、...) as tile characters 208.

Some embodiments include multiple spaced-apart characters 208 per language on the tile(s) 206, for one or more of the languages. For instance, some tiles 206 may include two or three hiragana characters but only a single English character. Some tile(s) 206 include similar characters 208 on a given tile, in at least one of the languages. For instance, a tile 206 may have ka, ga, and kya romaji/hiragana together with an English character K.

In some embodiments, however, characters 208 that share a tile 206 are not mere transliterations or near-transliterations of one another, so the interaction between tiles is more complex. For instance, placing 606 two tiles adjacent each other might be a successful move for one player because it forms a sensible (e.g., familiar, dictionary) word in one of the tile languages and simultaneously blocks a move by another player because it creates a nonsensical sequence of characters, thereby tying up some character and preventing its use in a sensible word. By contrast, a game piece which contains a Braille tactile symbol and a printed transliteration of that symbol in some language for sighted persons does not support such maneuvers. Indeed, game pieces which merely contain transliterations are not multilingual in the present sense, because they only bear two representations of a single language, rather than bearing representations of two (or more) different languages.

In some embodiments, letters on a given tile 206 may share a phonetic characteristic. For instance, the characters 208 on a given tile may all start with the same or similar sound, e.g., ka, ki, ku, ke, ko, and English K on a particular tile. In another instance, the characters 208 on a given tile may all contain the same or similar vowel sound, e.g., か、さ、た、な and English A on a particular tile.

In other embodiments, the cross-language correspondence reflected on a given tile 206 is not phonetic, but may instead be random, or it may be based on natural or adjusted character 208 frequency. For instance, the most frequently used hiragana letter may appear on the same tiles as the most frequently used English letter, the next most frequently used hiragana appears on the same tiles as the next most frequently used English letter, and so on. In a variation, rather than matching descending frequency in language A with descending frequency in language B, some embodiments match characters 208 of descending frequency in language A with characters of ascending frequency in language B, e.g., the least frequently used hiragana appear on tiles with the most frequently used English letters, and vice versa.

Character frequency on tiles 206 may be natural, based on analysis of typical texts such as web pages, newspapers, and the like written in the language in question. Natural character frequency may be adjusted for use on tiles 206, e.g., by using a subset of words (e.g., sports words, shorter words, nouns, nouns excluding proper nouns, etc.) as the basis for a frequency determination. Character frequency may also be adjusted so that infrequently used characters 208 are present at least once in a set of N tiles 206 even though their natural frequency is less than 1/N. When determining frequency of hiragana characters, Japanese natural text may be converted first to a text in which all kanji are changed into furigana (hiragana equivalents) before counting occurrences of each hiragana to determine relative frequency.

Some embodiments use square tiles 206, some use other shapes, e.g., triangles, hexagons, circles, etc. Some use tiles 206 on cube faces, as illustrated in FIG. 4. Note that tile indicator 402 indicates non-digital tiles 206 in general (regardless of shape etc.), as opposed to more specifically indicating cubical non-digital tiles. The enlarged view Japanese-English tiles 502 of FIG. 5 are examples of tiles which may be implemented as non-digital tiles 206, 402 or as digital tiles 206, 126.

Some embodiments use tiles 206 designed for a single layer of tiles, in the SCRABBLE® type of tile arrangement, while other embodiments use stackable tiles 206, similar to the tiles used in the UPWORDS® game but for inherently multilingual play as discussed here. Some embodiments use tiles 206 configured in cubes as shown in FIG. 4, which may be similar to the cubes used in the BOGGLE® game but have multilingual faces (tiles) as discussed here.

Tiles 206 may be physical (non-digital) tiles 402 or virtual (digital) tiles 126. Physical tiles may be made of wood, plastic, cardboard, cloth, magnets, and/or other materials. Virtual tiles are made of pixels and/or other computer graphic components on a computer, PDA, smart phone, netbook, KINDLE® device, or other device 102 having a software-controllable display screen 130. (KINDLE® is a mark of Amazon Technologies, Inc.).

Tiles 206 may be colored uniformly, or different colors may be used for different purposes, e.g., bonus point tile(s) may be a different color than other tiles.

A tile 206 may be marked with assigned 608 point value(s) in addition to being marked with characters 208. Point value 210 of a tile may depend on the language of the word being made and other aspects of how the tile 206 is positioned 606, such as whether it is on a bonus square or makes 620 words in multiple languages.

Some embodiments use words or other symbols as characters 208, and form sentences (or equations) during play (hence the generalization herein of "word" to mean an allowed arrangement of tiles 206), rather than (or in addition to) using letters as characters and forming dictionary words during play.

The example in FIG. 5 shows a configuration during game play using multilingual tiles 206 in Japanese and English, spelling the Japanese word くるま(車) horizontally and the English word CAT vertically. Tile point values 210 are shown in the respective languages, e.g., the leftmost tile marked with English G is worth 3 points in English words and 5 (土) points in Japanese words. The Figure also illustrates use of romaji, kanji, hiragana glide characters (e.g., きょ), and other multi-letter characters (e.g., ます, して). Although not shown, furigana characters 208 may also be used in some embodiments.

Some embodiments are used by placing 608 tiles on a virtual (digital) or physical board. The board 204 may have special squares, which have indicia to multiply the point value of a tile, for example, or otherwise increase (or decrease) to points that would be awarded for making the word in the absence of the special squares' indicia. Solitary play, play against a computer program, or play with alternating turns taken by two (or more) players may be used in some embodiments. Individual rules of play used in the SCRABBLE®, UPWORDS®, and/or BOGGLE® word games, for instance, or other word games involving combinations of characters, may be imported to a game 202 and employed while using multilingual tiles 206 as described herein.

Words are made in some embodiments by positioning 610 tiles in interlocking words such that every positioned tile is part of every word in every direction it touches (e.g., in the style of SCRABBLE® and UPWORDS® games). Words are made in some embodiments by recognizing words in tiles that are positioned 606 such that words are mingled with non-words (e.g., in the style of BOGGLE® games).

In some embodiments, characters 208 on a given tile 206 may have different spatial orientations from one another. For instance, a square tile could have a first character and also have three other characters which are rotated at ¼, ½, and ¾ of a full rotation relative to the first character. As another example, several characters around the edge of a tile's face could be oriented at a half rotation relative to a character located near the center of the tile's face. In some embodiments, characters on a tile in a first language are all oriented in a first direction, and characters on that same tile in a second language are all oriented in a second (different) direction, e.g., so a given player sees Japanese right-side-up and English upside-down on the tile. Many other relative orientations are also possible.

In some embodiments, each player can make 612 words only in one language. A player whose native language is English and who is learning Japanese may, for example, only be allowed to make words in Japanese, or may be allowed to make words in both languages but lose points for English words. In other embodiments, each player is allowed to make words in any of the languages used on the multilingual tiles.

In some embodiments, rules against use of proper nouns are removed or relaxed. For instance, Japanese personal names may be allowed 624 as accepted words, thereby assisting a player in learning Japanese, since many personal names are made of words/kanji that are also used in other contexts. For instance, the Japanese surname Yamamoto (やまもと、山本) means "base of the mountain" and its constituents are words in their own right.

In some software or other computing-based embodiments, characters used to form a word are highlighted 628 (bold font, different color, animation, etc.) during word search activities.

In some embodiments, extra points are awarded 632 if tiles form multiple words. In some, extra points are awarded if tiles form 620 words in multiple languages. In some, extra points are awarded if tiles form 622 related words, e.g., synonyms, antonyms, words which the player can use in a single sensible sentence (possibly of limited length), and so on.

In some embodiments, tiles are used in games 202 which combine word formation and word search. More generally, a wide variety of word games may be enhanced by using multilingual tiles 206, e.g., by allowing (or requiring) different players to use different languages, by allowing extra points for using multiple languages in a given move, and otherwise as discussed herein.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 6 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item or characteristic shown in the Figures need be present in every embodiment. Conversely, an embodiment may contain item(s) and/or characteristic(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method comprising the steps of:
    obtaining a set of multilingual tiles, each tile bearing a first character of a first language and also bearing a second character of a second language, in which the second character is not a transliteration of the first character; and
    positioning selected tiles to form words; and
    wherein at least one of the following is also present:
        a player gains points for words made in a language that is not the player's native language;
        a player loses points for words made in a language that is the player's native language;
        extra points are awarded if tiles form multiple words in multiple languages; or
        extra points are awarded if tiles form related words, namely, synonyms and/or antonyms.

2. The method of claim 1, wherein the method further comprises assigning point values to words formed by positioned tiles.

3. The method of claim 1, wherein the method comprises positioning tiles in interlocking words such that every positioned tile is part of every word in every direction it touches.

4. The method of claim 1, wherein each player can make words only in one language, and different players make words in different languages.

5. The method of claim 1, wherein Japanese personal names are allowed as accepted words.

\* \* \* \* \*